Patented Sept. 23, 1924.

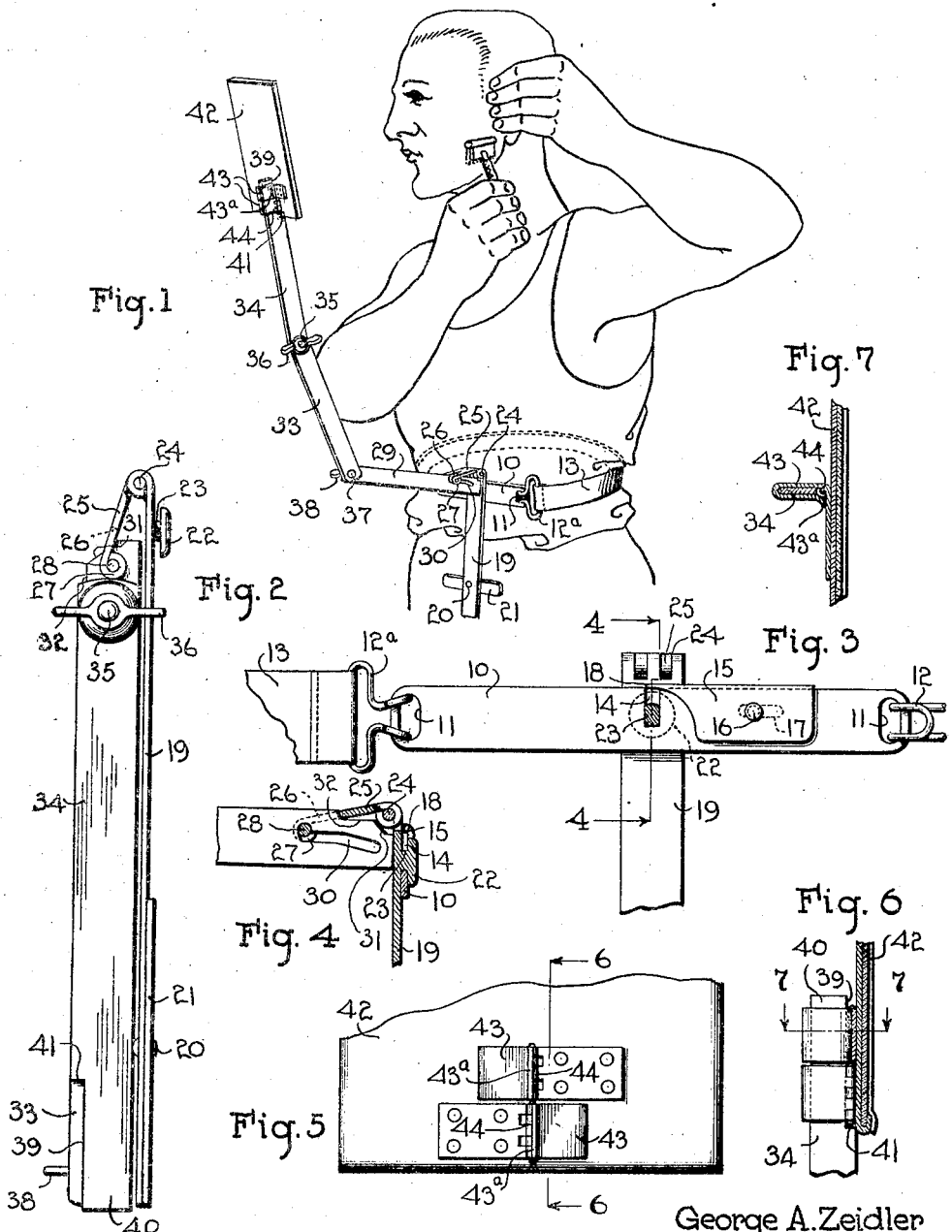

1,509,746

UNITED STATES PATENT OFFICE.

GEORGE A. ZEIDLER, OF CLEVELAND, OHIO.

MIRROR SUPPORT.

Application filed September 11, 1922. Serial No. 587,465.

*To all whom it may concern:*

Be it known that I, GEORGE A. ZEIDLER, a citizen of the United States, residing at Cleveland, in the county of Cuyahoga and State of Ohio, have invented a new and useful Improvement in Mirror Supports, of which the following is a specification.

This invention relates to mirror supports, and has for its object the provision of a novel device by means of which a mirror may be supported from the body in convenient position to enable a man to see a reflection of his face for the purpose of shaving, or with the use of another mirror may be used by a woman in arranging or bobbing her hair, or carrying out any other similar toilet operations, the device being readily foldable so as to occupy but little space in a traveling kit or the like, and the parts being so constructed, arranged and correlated as to permit ready adjustment to meet various conditions.

An important object is the provision of a device of this character which includes novel means whereby the device is detachably connected with an element carried by a waist encircling flexible member, locking means being provided to prevent disassociation of the parts.

Another object is the provision of a device of this character which is provided with a novel body brace carrying a peculiarly mounted supporting arm which, when in extended position, will have great rigidity.

A further object is the provision of novel means for mounting the mirror upon the adjustable support, this mounting being of such a nature that the mirror will be held rigidly and be prevented from any undesirable looseness.

To the attainment of the foregoing objects and advantages, the invention consists in the details of construction and arrangement to be hereinafter described and claimed, and illustrated in the drawings, although it should be understood that the present form is merely an exemplification of a preferred embodiment, and that various changes and modifications may be resorted to as may be found advantageous in increasing the adaptability and utility of the device, provided that such variations constitute no departure from the salient features of the invention or the scope of the claims.

In the drawings, wherein like reference characters designate corresponding parts in the several views:

Figure 1 is a perspective view of the device in use;

Figure 2 is a side elevation thereof showing it in folded position;

Figure 3 is a detail rear view of the body engaging member, showing its connection with the flexible body encircling member;

Figure 4 is a detail section on the line 4—4 of Figure 3;

Figure 5 is a detail rear view of a portion of the mirror showing the means for mounting the same upon its support in a folded position;

Figure 6 is a detail section on the line 6—6 of Figure 5, but with the mirror connected to the supporting member; and Figure 7 is a cross section on the line 7—7 of Figure 6.

Referring more particularly to the drawings, the numeral 10 designates the main supporting plate of the device, which is provided at its ends with openings 11, with which are engaged hooks 12, 12$^a$, carried by the ends of a preferably elastic waist encircling strap 13, one of the hooks 12$^a$ being held from separation from the plates. In actual practice it is preferable that this strap be provided with any suitable adjusting means, whereby it may be caused to fit properly upon persons of different sizes. At one edge the plate 10 is formed with a notch 14, and slidable along the plate is a locking device 15 carrying a pin 16, which passes through a slot 17 in the plate 10, whereby its movement will be guided and limited. One end of this locking device is formed with a reduced tongue or extension 18 which is designed to overlap and close the open end of the notch 14, for a purpose to be described.

Detachably associated with the plate 10 is an elongated vertically disposed bar 19 adapted to engage against the abdomen, and pivoted at 20 on this bar is a brace 21 which is normally disposed at right angles thereto when in its operative position, and which acts as a steadying member for the reason that it likewise bears against the body. Carried by the upper end of this bar 19 is a headed stud 22, having its shank 23 engageable within the notch 14, subsequent to which the locking member 15 is slid toward the bar 19 to cause the tongue 18 to extend across the open end of the notch 14, and prevent the stud 22 from becoming accidentally disconnected from the plate 10. Hinged at 24 upon one end of this bar 19, is a leaf 25, slotted at 26 and terminating in spaced knuckles 27 curled about a pin 28.

Associated with the bar 19 is an elongated strip 29, having one end formed with a substantially L-shaped slot 30, through which the pin 28 passes, this end of the strip 29 being received within the slot 26 between the knuckles 27. It is intended that when in operative position the strip 29 will extend at substantially right angles to the bar 19, the pin 28 being engaged within the upper end of the short arm of the L-shaped slot 30, and the free end of the strip 29 abutting against the upper end of the bar 19 adjacent the hinge 24 thereon, the corner of the strip 29 being cut away, as indicated at 31 for the accommodation of the hinge, and the upper edge near the corner being somewhat cut away at 32 for the accommodation of the unslotted portion of the leaf 25. The strip 29 projects at an angle to the bar 19.

Any desired number of adjustable sections may be carried by the strip 29, though I have shown two links or strips 33 and 34, which are pivotally adjustably connected by a bolt 35 carrying a wing nut 36, and the former of which is pivotally connected with the free end of the strip 29 by a bolt 37 carrying a clamping nut 38. The free end of the link 34 is cut away at one edge, as indicated at 39, to define a finger-like extension 40 and a shoulder 41.

The mirror 42 may be of any desired size and shape and of any preferred construction, and is provided at its rear side with a pair of flat, approximately rectangular loops 43, which are hinged at 44 and which are swingable in opposite directions to extend at right angles from the back of the mirror, the hinge connection being a form of knee joint, whereby the movement will be limited to such right angle position. When the loops are in position extending at right angles from the mirror, they are in alinement with each other and they may receive the finger-like extension 40 of the link 34 and, owing to the knee hinge joint, it is apparent that the connection will be rigid. The shoulder 41 serves as a stop. As shown in Figure 7, the free edge of each loop is turned outwardly at 43ª to serve as a stop for the loops when in operative position.

When the device is applied, as illustrated in Figure 1, the bar 19 and cross member 21 bear against the abdomen with the strip 29 extending forwardly in a slight upward inclination. The engagement of the free end of the strip 29 with the upper end of the bar 19, and the fitting of the pin 28 within the upper end of the short arm of the L-shaped slot 30, insures rigidity and prevents any possible displacement of the strip 29. The position of the mirror 42 is adjusted readily by varying the positions of the links 33 and 34, such adjustment being readily effected by manipulating the clamping pivotal connections. The device is manifestly of considerable advantage to travelers, sportsmen and others who may not have ready access to an ordinary mirror for the purpose of shaving and the like, or where the light in the room is poor. It is also useful for ladies.

To disassemble the parts for storage or packing in a traveling bag, the mirror is simply pulled away from the link 34, the extension 40 sliding out of the loops 43, which are then swung in opposite directions to lie flat against the back of the mirror, as disclosed in Figure 5. The wing nuts 36 and 38 are loosened to permit the links 33 and 34 to be folded, and the bar 19 is swung out of engagement with the free end of the strip 29, so that it may be pulled to cause the pin 28 to ride out of the short arm and into the opposite end of the long arm of the L-shaped slot 30, after which the bar 19 is swung to lie against the edge of the strip 29, the leaf 25 then extending at an acute angle with respect to the bar 19. Disconnection of these parts from the plate 10 is effected by sliding the lock 15 toward the adjacent end of the plate 10, and then moving the plate 10 and bar 19 relatively to disengage the shank of the stud 22 from the notch 14. It should be mentioned that the brace 21 is swung upon its pivot 20 to lie along the strip 19. This folded position of the parts is shown in Figure 2, and from an inspection thereof it will be apparent that the device will occupy but very little space when collapsed.

From the foregoing description and a study of the drawings, it will thus be seen that I have provided a neat, simple and easily applied and adjusted mirror support, which is capable of extensive use, and which will be of manifest convenience under various conditions where the usual facilities are not available. As the structure is comparatively simple, it is to be noted that there is little to get out of order and that the device should have a long life.

What is claimed is:—

1. A mirror support comprising a body encircling member, a transversely arranged supporting plate connected therewith and adapted to bear flatwise against the front of the body of the wearer, a vertically disposed bar, means for rigidly but detachably connecting the upper end of said bar to said plate intermediate of the length of the latter, the bar depending from the plate and adapted to bear flatwise against the abdomen, a supporting strip outstanding from said plate and said bar at the upper end of the latter, a permanent connection between said bar and said strip, which connection is independent of the detachable connection between said bar and said plate, said permanent connection providing for a slidable and pivotal movement of the elements and normally holding the inner end of said strip against said plate, and a series of links adjustably connected to each other and carried by said strip and having means for supporting a mirror, said strip and said links being arranged edgewise and foldable one against the other and alongside said strip.

2. In a mirror supporting device, a supporting plate, a body encircling member detachably connected with said plate for holding the same transversely at the front of the body, a vertically disposed bar detachably connected with the plate and depending from the same and adapted to bear against the front of the body, said bar carrying a series of adjustably connected strips, the uppermost strip supporting a mirror and the lowermost one extending outwardly from the body, means for detachably connecting said bar with said plate, consisting of a headed stud projecting from the bar and received within a notch in the plate, and a locking member carried by the plate and movable to cover the open end of the notch to prevent disengagement of the stud therefrom.

3. In a mirror supporting device, a supporting plate forming a part of a body encircling member, said plate having a notch, a series of pivotally connected elements, the uppermost element carrying a mirror, a stud projecting from the lowermost element and engaged with said notch, and a locking member slidably mounted along said plate and having an extension movable across said notch to retain said stud therein.

4. In a mirror support, a body encircling member, a plate carried thereby, a vertically disposed bar detachably connected with said plate and depending therefrom and adapted to bear against the front of the body and carrying a series of adjustably connected link elements for holding a mirror, and a brace formed as a transverse strip pivoted intermediate its ends upon said bar and swingable to lie therealong or at right angles thereto.

5. In a mirror support, a body encircling member, a plate carried thereby, a depending vertically disposed bar carried by the plate and provided with a hinged leaf, a strip pivotally and slidably connected with the free end of the leaf and having one end engageable against said bar, whereby to constitute a forwardly extending arm, and an adjustable mirror supporting member connected with the said strip.

6. In a mirror holding device including a body encircling member carrying a plate having a depending vertically disposed bar thereon, a leaf hinged upon the upper end of said bar and terminating in spaced knuckles carrying a pin, a strip engaged between said knuckles and formed with an angular slot receiving said pin, said strip constituting a supporting arm, and an adjustably connected member carried by said arm for holding a mirror, said strip when in one position extending at right angles to the plate with said pin engaging with one end of said slot, and when in another position with said pin at the other end of said slot and with said leaf disposed at an acute angle.

7. In a mirror support, a supporting strip, a mirror, and a plurality of flat, approximately rectangular loops hingedly mounted upon the back of the mirror in alinement with each other and receiving one end of said strip, said end of the strip having a reduced finger-like extension fitting within the loops, and a limiting shoulder.

8. Means for connecting a mirror to a supporting element comprising a pair of loops hinged by knee joints in alinement with each other upon the back of the mirror and swingable in opposite directions to lie selectively thereagainst or at right angles thereto for the reception of said element.

9. Means for connecting a mirror to a supporting element comprising a pair of loops hinged by knee joints in alinement with each other upon the back of the mirror and swingable in opposite directions to lie selectively thereagainst or at right angles thereto for the reception of said element, said loops each having its free edge opposite the hinge outturned to form a stop to hold the loop at a right angle to the back of the mirror.

10. A device of the character described comprising a flexible body encircling member, a supporting plate detachably connected therewith to lie transversely of the body, a depending vertically disposed bar detachably connected with said plate to bear against the front of the body, an auxiliary brace pivoted upon and normally extending transversely of said bar, a strip slidably and pivotally and detachably connected with said bar and normally extending forwardly to constitute a support, a series of pivotally connected links carried by said strip, a mirror, and attaching means carried by the mirror and detachably engaged with the free end of the endmost link.

In testimony, that I claim the foregoing as my own, I have hereto affixed my signature.

GEORGE A. ZEIDLER.